(12) United States Patent
Torrey et al.

(10) Patent No.: US 11,606,017 B2
(45) Date of Patent: Mar. 14, 2023

(54) WIND TURBINE HAVING SUPERCONDUCTING GENERATOR AND ARMATURE FOR USE IN THE SUPERCONDUCTING GENERATOR

(71) Applicant: General Electric Company, Schenectady, NY (US)

(72) Inventors: David Allan Torrey, Ballston Spa, NY (US); Wei Zhang, Ballston Lake, NY (US); Mark Ernest Vermilyea, Niskayuna, NY (US); James William Bray, Niskayuna, NY (US); Siddharth Navinchandra Ashar, Niskayuna, NY (US); Hendrik Pieter Jacobus de Bock, Clifton Park, NY (US); Weijun Yin, Niskayuna, NY (US); Alexander Kagan, Guilderland, NY (US); Anoop Jassal, Schenectady, NY (US); Joseph John Zierer, Niskayuna, NY (US); Rammohan Rao Kalluri, Munich (DE)

(73) Assignee: General Electric Company, Schenectady, NY (US)

(*) Notice: Subject to any disclaimer, the term of this patent is extended or adjusted under 35 U.S.C. 154(b) by 171 days.

(21) Appl. No.: 17/254,375

(22) PCT Filed: Jun. 27, 2018

(86) PCT No.: PCT/US2018/039689
§ 371 (c)(1),
(2) Date: Dec. 21, 2020

(87) PCT Pub. No.: WO2020/005221
PCT Pub. Date: Jan. 2, 2020

(65) Prior Publication Data
US 2021/0273547 A1    Sep. 2, 2021

(51) Int. Cl.
*H02K 55/04* (2006.01)
*H02K 9/19* (2006.01)
(Continued)

(52) U.S. Cl.
CPC ............ *H02K 55/04* (2013.01); *F03D 9/25* (2016.05); *F03D 15/00* (2016.05); *F03D 80/60* (2016.05);
(Continued)

(58) Field of Classification Search
CPC ........... H02K 55/04; H02K 9/19; H02K 3/32; H02K 3/34; H02K 11/20; H02K 11/012;
(Continued)

(56) References Cited

U.S. PATENT DOCUMENTS

| 3,743,867 A | 7/1973 | Smith |
| 4,037,124 A * | 7/1977 | Kullmann ................ H02K 3/24 310/52 |

(Continued)

FOREIGN PATENT DOCUMENTS

| JP | S49 7604 Y1 | 2/1974 |
| JP | H05219666 A | 8/1993 |

OTHER PUBLICATIONS

PCT Search Report, dated May 28, 2019.

*Primary Examiner* — Burton S Mullins
(74) *Attorney, Agent, or Firm* — Dority & Manning, P.A.

(57) ABSTRACT

An armature is presented. The armature includes an armature winding having a plurality of coils, wherein each coil of the plurality of coils is spaced apart from adjacent coils and comprise includes a first side portion and a second side portion. The armature further includes a first electrically insulating winding enclosure. Furthermore, the armature includes a second electrically insulating winding enclosure disposed at a radial distance from the first electrically
(Continued)

insulating winding enclosure, wherein the armature winding is disposed between the first electrically insulating winding enclosure and the second electrically insulating winding enclosure. Moreover, the armature includes an electrically insulating coil side separator disposed between the first side portion and the second side portion of the plurality of coils of the armature winding. A superconducting generator including the armature and a wind turbine having such superconducting generator are also presented.

14 Claims, 10 Drawing Sheets

(51) Int. Cl.
| | | |
|---|---|---|
| H02K 3/24 | (2006.01) | |
| H02K 3/32 | (2006.01) | |
| H02K 3/34 | (2006.01) | |
| H02K 7/18 | (2006.01) | |
| F03D 9/25 | (2016.01) | |
| F03D 80/60 | (2016.01) | |
| H02K 11/20 | (2016.01) | |
| F03D 15/00 | (2016.01) | |
| H02K 11/01 | (2016.01) | |
| H01F 6/06 | (2006.01) | |
| H02K 15/00 | (2006.01) | |
| H02K 15/10 | (2006.01) | |

(52) U.S. Cl.
CPC .............. *H01F 6/06* (2013.01); *H02K 3/24* (2013.01); *H02K 7/1838* (2013.01); *H02K 11/012* (2020.08); *H02K 11/20* (2016.01); *H02K 15/00* (2013.01); *H02K 15/10* (2013.01); *F05B 2240/21* (2013.01); *F05B 2260/20* (2013.01)

(58) Field of Classification Search
CPC ........ H02K 3/24; H02K 7/1838; H02K 15/00; H02K 15/10; F03D 9/25; F03D 80/60
USPC ........................................ 310/52, 58; 290/55
See application file for complete search history.

(56) References Cited

U.S. PATENT DOCUMENTS

| | | | |
|---|---|---|---|
| 4,427,907 A * | 1/1984 | Flick ..................... H02K 55/04 | |
| | | | 310/52 |
| 5,313,131 A | 5/1994 | Hibino et al. | |
| 5,408,152 A * | 4/1995 | Finnerty ................. H02K 3/24 | |
| | | | 310/53 |
| 6,628,020 B1 | 9/2003 | Tong | |
| 6,806,612 B2 * | 10/2004 | Nakamura ............... H02K 3/04 | |
| | | | 310/201 |
| 7,741,738 B2 * | 6/2010 | Ries ...................... H02K 55/04 | |
| | | | 310/91 |
| 7,928,616 B2 * | 4/2011 | Sivasubramaniam .... F03D 9/25 | |
| | | | 310/58 |
| 9,787,160 B2 * | 10/2017 | Wu ...................... H02P 29/0241 |
| 10,298,097 B2 * | 5/2019 | Smaoui .................... H02K 9/20 |
| 2004/0017125 A1 | 1/2004 | Nakamura et al. | |
| 2008/0061637 A1 | 3/2008 | Gamble et al. | |
| 2013/0181553 A1 | 7/2013 | Wu et al. | |
| 2018/0019642 A1 | 1/2018 | Wang et al. | |

* cited by examiner

WIND TURBINE HAVING SUPERCONDUCTING GENERATOR AND ARMATURE FOR USE IN THE SUPERCONDUCTING GENERATOR

TECHNICAL FIELD

Embodiments of the present specification generally relate to a wind turbine and in particular, to a wind turbine including a superconducting generator.

BACKGROUND

Conventional superconducting machines such as a conventional superconducting generator typically includes field windings and an armature. The armature includes traditional ferromagnetic core and armature windings disposed on the traditional ferromagnetic core. The armature windings are generally formed using conventional materials, for example, copper or aluminum. Whereas, the field windings include superconducting wires that support very high current densities without incurring any dissipation. The conventional superconducting generator, when operated, the superconducting wires generate very high magnetic field, for example, on the order of 7 Tesla or larger due to the high current densities in the field winding. Such increased or magnetic field caused due to the superconducting wires is generally above the saturation flux density of traditional ferromagnetic materials. Additionally, due to the currents in the armature windings, the armature is also heated, leading to reduced life time of an armature insulation system within the superconducting generator.

BRIEF DESCRIPTION

In accordance with one embodiment of the present invention, a wind turbine is presented. The wind turbine includes a rotor having a plurality of blades. The wind turbine further includes a shaft coupled to the rotor and a superconducting generator coupled to the rotor via the shaft and configured to be operated via the rotor. The superconducting generator includes a stationary generator field, a superconducting field winding disposed on the stationary generator field, and an armature disposed concentric to the stationary generator field. The armature includes an armature winding having a plurality of coils, where each coil of the plurality of coils is spaced apart from adjacent coils and includes a first side portion and a second side portion. The armature further includes a first electrically insulating winding enclosure. Furthermore, the armature includes a second electrically insulating winding enclosure disposed at a radial distance from the first electrically insulating winding enclosure, where the armature winding is disposed between the first electrically insulating winding enclosure and the second electrically insulating winding enclosure. Moreover, the armature includes an electrically insulating coil side separator disposed between the first side portion and the second side portion of the plurality of coils of the armature winding. Additionally, the armature includes a plurality of electrically insulating spacers, where at least one electrically insulating spacer is disposed between adjacent first side portions, and between adjacent second side portion, and where one or more of the plurality of electrically insulating spacers include at least one cooling channel configured to facilitate a flow of a cooling fluid therethrough to aid cooling of the armature winding.

In accordance with another embodiment of the present invention, an armature is presented. The armature includes an armature winding having a plurality of coils, where each coil of the plurality of coils is spaced apart from adjacent coils. The armature further includes a first electrically insulating winding enclosure. Furthermore, the armature includes a second electrically insulating winding enclosure disposed at a radial distance from the first electrically insulating winding enclosure, where the armature winding is disposed between the first electrically insulating winding enclosure and the second electrically insulating winding enclosure.

In accordance with yet another embodiment of the present invention, a superconducting generator is presented. The superconducting generator includes a stationary generator field, a superconducting field winding disposed on the stationary generator field, and an armature disposed concentric to the stationary generator field. The armature includes an armature winding having a plurality of coils, where each coil of the plurality of coils is spaced apart from adjacent coils and includes a first side portion and a second side portion. The armature further includes a first electrically insulating winding enclosure. Furthermore, the armature includes a second electrically insulating winding enclosure disposed at a radial distance from the first electrically insulating winding enclosure, where the armature winding is disposed between the first electrically insulating winding enclosure and the second electrically insulating winding enclosure. Moreover, the armature includes an electrically insulating coil side separator disposed between the first side portion and the second side portion of the plurality of coils of the armature winding.

DRAWINGS

These and other features, aspects, and advantages of the present specification will become better understood when the following detailed description is read with reference to the accompanying drawings in which like characters represent like parts throughout the drawings, wherein.

DETAILED DESCRIPTION

Figure 1:
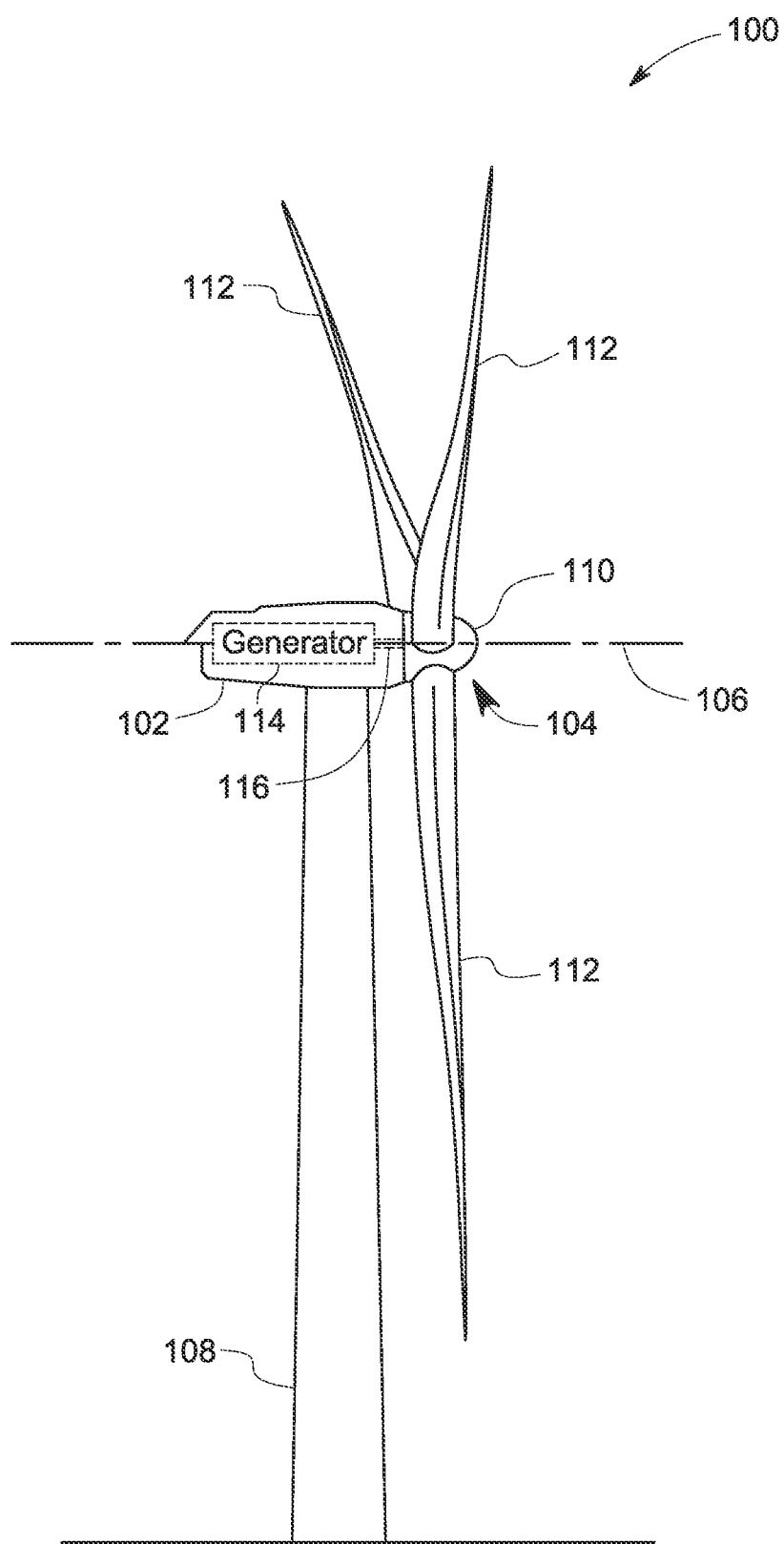
FIG. 1 is a schematic diagram of an example wind turbine, in accordance with one embodiment of the present specification.

In an effort to provide a concise description of these embodiments, all features of an actual implementation may not be described in the specification. It should be appreciated that in the development of any such actual implementation, as in any engineering or design project, numerous implementation-specific decisions may be made to achieve the developer's specific goals such as compliance with system-related and business-related constraints.

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

As will be described in detail hereinafter, various embodiments of a wind turbine are presented. The wind turbine includes a rotor having a plurality of blades. The wind turbine further includes a shaft coupled to the rotor and superconducting generator coupled to the rotor via the shaft and configured to be operated via the rotor. In some embodiments, the superconducting generator includes a stationary generator field, a superconducting field winding disposed on the stationary generator field, and an armature disposed concentric to the stationary generator field.

In some embodiments, the armature includes an armature winding having a plurality of coils, where each coil of the plurality of coils is spaced apart from adjacent coils and includes a first side portion and a second side portion. The armature further includes a first electrically insulating winding enclosure. Furthermore, the armature includes a second electrically insulating winding enclosure disposed at a radial distance from the first electrically insulating winding enclosure, where the armature winding is disposed between the first electrically insulating winding enclosure and the second electrically insulating winding enclosure. Moreover, the armature includes an electrically insulating coil side separator disposed between the first side portion and the second side portion of the plurality of coils of the armature winding.

In certain embodiments, the armature may additionally include a plurality of electrically insulating spacers, where at least one electrically insulating spacer is disposed between adjacent first side portions, and between adjacent second side portions, and where one or more of the plurality of electrically insulating spacers include at least one cooling channel configured to facilitate a flow of a cooling fluid therethrough to aid cooling of the armature winding.

Referring now to FIG. 1, a schematic diagram of an example wind turbine 100 is presented, in accordance with one embodiment of the present specification. The wind turbine 100 may be configured to generate electrical power using wind energy. The wind turbine 100 described and illustrated in the embodiment of FIG. 1 includes a horizontal-axis configuration. However, in some embodiments, the wind turbine 100 may include, in addition or alternative to the horizontal-axis configuration, a vertical-axis configuration (not shown). The wind turbine 100 may be coupled to, such as, but not limited to, a power grid, for receiving electrical power therefrom to drive operation of wind turbine 100 and/or its associated components and/or for supplying electrical power generated by the wind turbine 100 thereto. The wind turbine 100 may be coupled to an electrical load (not shown) to supply electrical power generated by the wind turbine 100 thereto to the electrical load.

The wind turbine 100 may include a body 102, sometimes referred to as a "nacelle," and a rotor 104 coupled to the body 102. The rotor 104 is configured to rotate with respect to the body 102 about an axis of rotation 106. In the embodiment of FIG. 1, the nacelle 102 is shown as mounted on a tower 108. However, in some other embodiments, the wind turbine 100 may include a nacelle that may be disposed adjacent to the ground and/or a surface of water.

The rotor 104 may include a hub 110 and a plurality of blades 112 (sometimes referred to as "airfoils") extending radially outwardly from the hub 110 for converting wind energy into rotational energy. Although the rotor 104 is described and illustrated herein having three blades 112, the rotor 104 may have any number of blades 112. The rotor 104 may have blades 112 of any shape, and may have blades 112 of any type and/or any configuration, whether such shape, type, and/or configuration is described and/or illustrated herein.

In some embodiments, the nacelle 102 may house, fully or partially, one or more of a superconducting generator 114 and a shaft 116. The superconducting generator 114 may be coupled to the rotor 104 via the shaft 116 and configured to be operated via the rotor 104. For example, rotations of the rotor 104 caused due to the wind energy in turn cause a rotary element (e.g., an armature) of the superconducting generator 114 to rotate via the shaft 116. In some embodiments, the shaft 116 may also include a gear box (not shown). In certain embodiments, use of the gear box may increase an operating speed of the superconducting generator 114 and reduce the torque requirement for a given power level. The presence or absence of the gearbox is immaterial to the embodiments of the superconducting generator 114 described in the present specification.

The superconducting generator 114 is configured to generate electrical power based at least on the rotations of the armature. In accordance with some embodiments described herein, the superconducting generator 114 may be configured to handle increased magnitudes of electrical current in comparison to traditional generators. The superconducting generator 114 may be implemented in the form of a synchronous generator. The superconducting generator 114 will be described in greater details in conjunction with FIG. 2.

Figure 2:
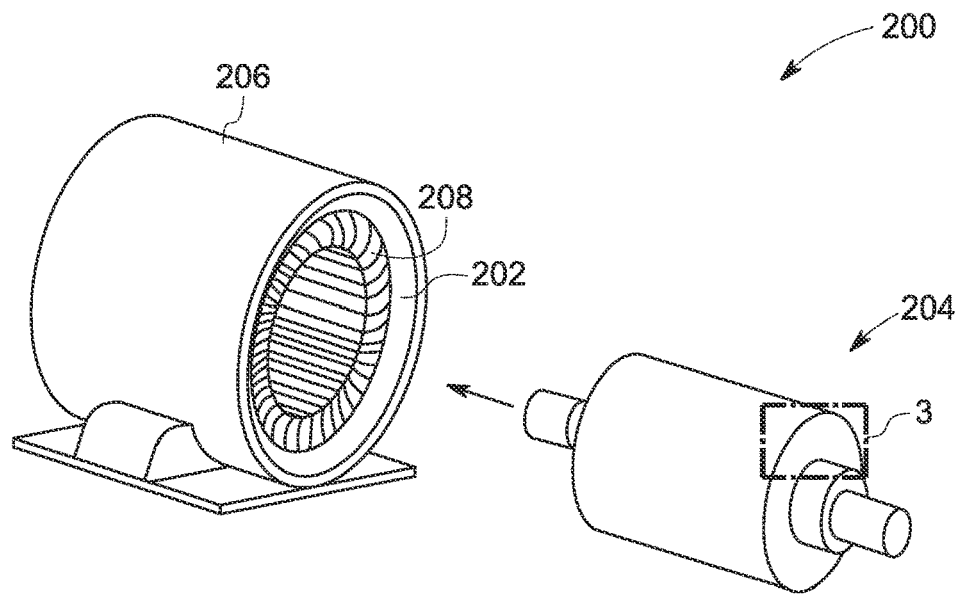
FIG. 2 is a schematic diagram of a superconducting generator, in accordance with one embodiment of the present specification.

FIG. 2 is a schematic diagram of a superconducting generator 200, in accordance with one embodiment of the present specification. The superconducting generator 200 may be representative of one embodiment of the superconducting generator 114 used in the wind turbine 100 of FIG. 1. Without limiting the scope of the present application, the superconducting generator 200 may be used in any application other than wind turbines. Although the superconducting generator 200 depicted in FIG. 2 is a radial field electric machine, embodiments of the present specification are also applicable to axial field or transverse field superconducting generators.

As depicted in FIG. 2, the superconducting generator 200 includes a stationary generator field 202 and an armature 204 disposed in a housing 206. In particular, FIG. 2 depicts an exploded view of the superconducting generator 200 to separately show the stationary generator field 202 and an armature 204.

The stationary generator field 202 is disposed adjacent to the armature 204. As used herein, the term "disposed adjacent to" with respect to positioning of the stationary generator field 202 and the armature 204, refers to relative positioning of the stationary generator field 202 and the armature 204 such that the armature 204 is surrounded by the stationary generator field 202 (for example, as illustrated in FIG. 2), in one embodiment. In another embodiment, the term "disposed adjacent to" refers to relative positioning of the stationary generator field 202 and the armature 204 such that the stationary generator field 202 is surrounded by the armature 204 (not shown). In yet another embodiment, the term "disposed adjacent to" refers to relative positioning of the stationary generator field 202 and the armature 204 such that the stationary generator field 202 and the armature 204 are disposed side-by-side (not shown).

Further, in some embodiments, the superconducting generator 200 may also include a superconducting field winding 208 disposed on the stationary generator field 202. The superconducting field winding 208 may include one or more coils made using electrically conductive materials that transition to a superconducting state at sufficiently low temperatures. Such materials include niobium tin alloy, niobium titanium alloy, magnesium diboride alloy, any of a number of ceramic materials that have exhibited superconducting properties, or combinations thereof. Often electrically conductive materials including, such as, but not limited to, copper, aluminum, anodized aluminum, silver, gold, or combinations thereof are used in combination with superconducting alloys for improved mechanical properties. In certain embodiments, low weight electrically conductive materials may be used to increase or at least maintain a power density of the superconducting generator 200. In some embodiments, the superconducting generator 200 may also include suitable arrangement (not shown) for cooling the superconducting field winding 208 to cryogenic temperatures.

By way of example, in some embodiments, when the superconducting generator 200 is deployed as the superconducting generator 114 in the wind turbine 100, the armature 204 may be coupled to the rotor 104 of the wind turbine 100 via the shaft 116 or via both the shaft 116 and the gear box. Consequently, the armature 204 may be rotated due to the rotations of the rotor 104 caused due to the wind energy. Due to the rotations of the armature 204, the superconducting generator 200 may generate electrical power by virtue of the voltage induced in armature windings as they move past the magnetic field established by the superconducting field winding 208. Structural details of the armature 204 will be described in conjunction with FIGS. 3-8.

Figure 3:
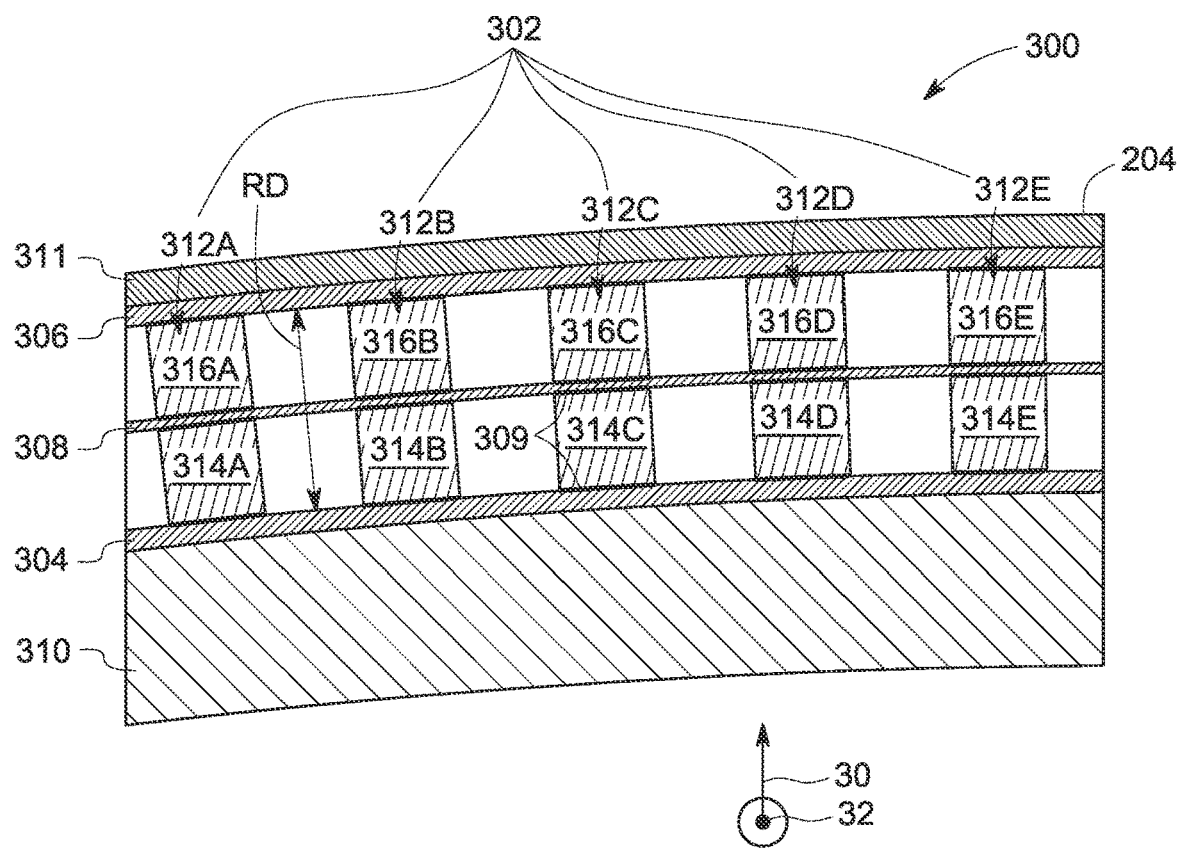
FIG. 3 is a cross-sectional view of a portion of an armature used in the superconducting generator of FIG. 2, in accordance with one embodiment of the present specification.

Turning now to FIG. 3, a cross-sectional view 300 of a portion 3 (as marked in FIG. 2) of the armature 204 used in the superconducting generator 200 of FIG. 2 is presented, in accordance with one embodiment of the present specification. Reference numerals 30 and 32 respectively represent a radial direction and an axial direction of the armature 204. As depicted in FIG. 3, in some embodiments, the armature 204 may include an armature winding 302, a first electrically insulating winding enclosure 304, a second electrically insulating winding enclosure 306, and an electrically insulating coil side separator 308, and a base 310 (sometimes also referred to as a mandrel).

The first electrically insulating winding enclosure 304 may be disposed on the base 310. The base 310 may be formed using a solid block or laminations of one or more ferromagnetic materials. The second electrically insulating winding enclosure 306 is disposed at a radial distance (Rd) from the first electrically insulating winding enclosure 304. In some embodiments, the first electrically insulating winding enclosure 304 and the second electrically insulating winding enclosure 306 may be formed using fiber-reinforced composite materials. Non-limiting examples of these fiber-reinforced composite materials may include G-10, G-11, F-24, FR-4, other filer reinforced polymers, or combinations thereof. The armature winding 302 is disposed between the first electrically insulating winding enclosure 304 and the second electrically insulating winding enclosure 306, as depicted in FIG. 3.

Moreover, optionally, in certain embodiments, the armature 204 may include a shield 311 disposed on the second electrically insulating winding enclosure 306. Use of the shield 311 maintains a magnetic flux from the superconducting field winding 208 to remain in the radial direction 30, thereby enhancing magnetic coupling between the stationary generator field 202 and armature windings 302. Advantageously, due to such improved magnetic coupling between the armature windings 302 and the stationary generator field 202 electromagnetic performance of the superconducting generator 200 may be improved. The shield 311 may be formed using ferromagnetic material. In some embodiments, the shield 311 may be laminated to reduce losses associated with induced currents, as in a conventional electric machine. For the location of shield 311 as depicted in FIG. 3, the superconducting field winding 208 may be located radially inside of the first electrically insulating enclosure 304. With the superconducting field winding 208 radially outside of the armature winding, shield 311 would be adjacent to the first electrically insulating enclosure 304. In this case, shield 311 could replace the base 310 during armature assembly.

The armature winding 302 includes a plurality of coils 312A, 312B, 312C, 312D, and 312E. The coils 312A, 312B, 312C, 312D, and 312E are hereinafter collectively referred to as coils 312. Although, five coils 312A-312E are depicted in the cross-sectional view 300 of FIG. 3, any number of coils may be employed in the armature 204, without limiting the scope of the present specification. The coils 312 would be configured into phase windings, the number of which are determined by the designer. Non-limiting examples of the electrically conductive materials used to form the coils 312 may include copper, aluminum, silver, gold, or combinations thereof.

In some embodiments, as depicted in FIG. 3, the coils 312 are spaced apart from each other. For example, each coil of the plurality of coils 312 is spaced apart from adjacent coils. The space between adjacent coils 312 may act as or be utilized as cooling ducts, where a cooling fluid such as air may be passed therethrough. Advantageously, the configuration of the armature 204 as depicted in FIG. 3 aids in lowering operating temperature of the armature 204. Also, in certain embodiments, the coils 312 may be coated with electrically insulating coating so that flow of the cooling fluid may not impact electrical operation of the superconducting generator 200.

Moreover, each of the coils 312 includes a first side portion, a second side portion, and end portions. For example, the coil 312A includes a first side portion 314A, a second side portion 316A, and end portions 318A, 320A (not shown in FIG. 3, see FIGS. 11C-11G). The coil 312B includes a first side portion 314B, a second side portion 316B, and end portions 318B, 320B (not shown in FIG. 3, see FIGS. 11C-11G). The coil 312C includes a first side portion 314C, a second side portion 316C, and end portions 318C, 320C (not shown in FIG. 3, see FIGS. 11C-11G). The coil 312D includes a first side portion 314D, a second side portion 316D, and end portions 318D, 320D (not shown in FIG. 3, see FIGS. 11C-11G). The coil 312E includes a first side portion 314E, a second side portion 316E, and end portions 318E, 320E (not shown in FIG. 3, see FIGS. 11C-11G). The first side portions 314A, 314B, 314C, 314D, 314E are hereinafter collectively referred to as first side portions 314. The second side portions 316A, 316B, 316C, 316D, 316E are hereinafter collectively referred to as second side portions 316. Further, the end portions 318A, 318B, 318C, 318D, 318E are hereinafter collectively referred to as end portions 318. Moreover, the end portions 320A, 320B, 320C, 320D, 320E are hereinafter collectively referred to as end portions 320. Furthermore, in some embodiments, the first side portions 314 and the second side portions 316 are radially and tangentially displaced from one another and connected by end portions (not shown in FIG. 3). By way of example, in such configuration, the first side portions 314 and the second side portions 316 that are radially adjacent belong to different coils 312. For example, first side portion 314A and second side portion 316A belong to different coils. These different coils 312 may belong to the same or different phases.

Further, in some embodiments, the electrically insulating coil side separator 308 is disposed between the first side portions 314 and the second side portions 316 of the coils 312. The electrically insulating coil side separator 308 provides electrical insulation along a length between the first side portions 314 and the second side portions 316. By way of example, the electrically insulating coil side separator 308 may be formed using non-ferromagnetic material(s) such as G-10, FR-4, G-11, F-24, or other filer reinforced polymers, or combinations thereof.

In some embodiments, in a configuration of the armature 204 as depicted in FIG. 2 where the armature 204 is surrounded by the stationary generator field 202, the second electrically insulating winding enclosure 306 may form the outer-most support structure for the armature winding 302 and the first electrically insulating winding enclosure 304 may form the inner-most support structure that is disposed on the base 310 of the armature 204. In this case, shield 311 would be adjacent to the first electrically insulating enclosure 304. In this case, shield 311 could replace the base 310 during armature assembly.

In certain embodiments, the second electrically insulating winding enclosure 306 may have a constant or substantially constant radius along an active length of the superconducting generator 200. The term "active length" as used herein refers to a length of one of the first side portions 314 or the second side portions 316. Further, in some configurations of the armature 204, the radius of the second electrically insulating winding enclosure 306 may be varied (increased or decreased) about the end portions 318, 320 of each of the coils 312 to support the end portions 318, 320 of each of the coils 312. Such support provided to the end portions 318, 320 enhances mechanical integrity of the armature 204. In addition, the second electrically insulating winding enclosure 306 may also serve as a baffle for directing cooling air along the coils 312. In some embodiments, other elements such as a seal (not shown) to prevent leakage of a cooling fluid from the armature 204 may be provided on the second electrically insulating winding enclosure 306.

In some embodiments, the plurality of coils 312 is secured with the first electrically insulating winding enclosure 304, the second electrically insulating winding enclosure 306, and the electrically insulating coil side separator 308 using a bonding agent 309. For example, the first side portions 314 of the coils 312 are secured with the first electrically insulating winding enclosure 304 and the electrically insulating coil side separator 308 via the bonding agent 309. Also, the second side portions 316 of the coils 312 are secured with the second electrically insulating winding enclosure 306 and the electrically insulating coil side separator 308 via the bonding agent 309. It will be appreciated that the bonding agent 309 holds the plurality of coils 312 in place in the face of the magnetic tangential and radial forces imposed on the coils 312 as a result of the currents flowing in the armature windings 302 within the magnetic field created by the superconducting field windings 208.

Figure 4:
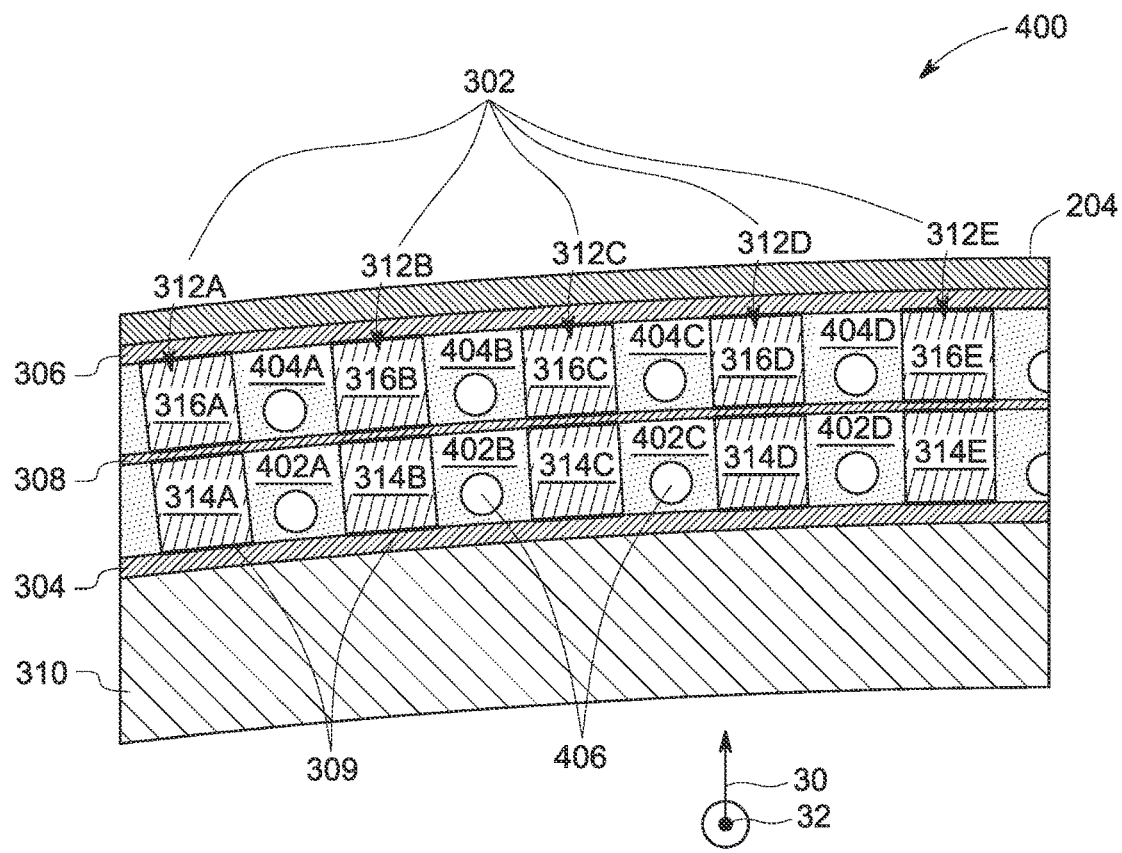
FIG. 4 is a cross-sectional view of a portion of an armature used in the superconducting generator of FIG. 2, in accordance with another embodiment of the present specification.
Figure 5:
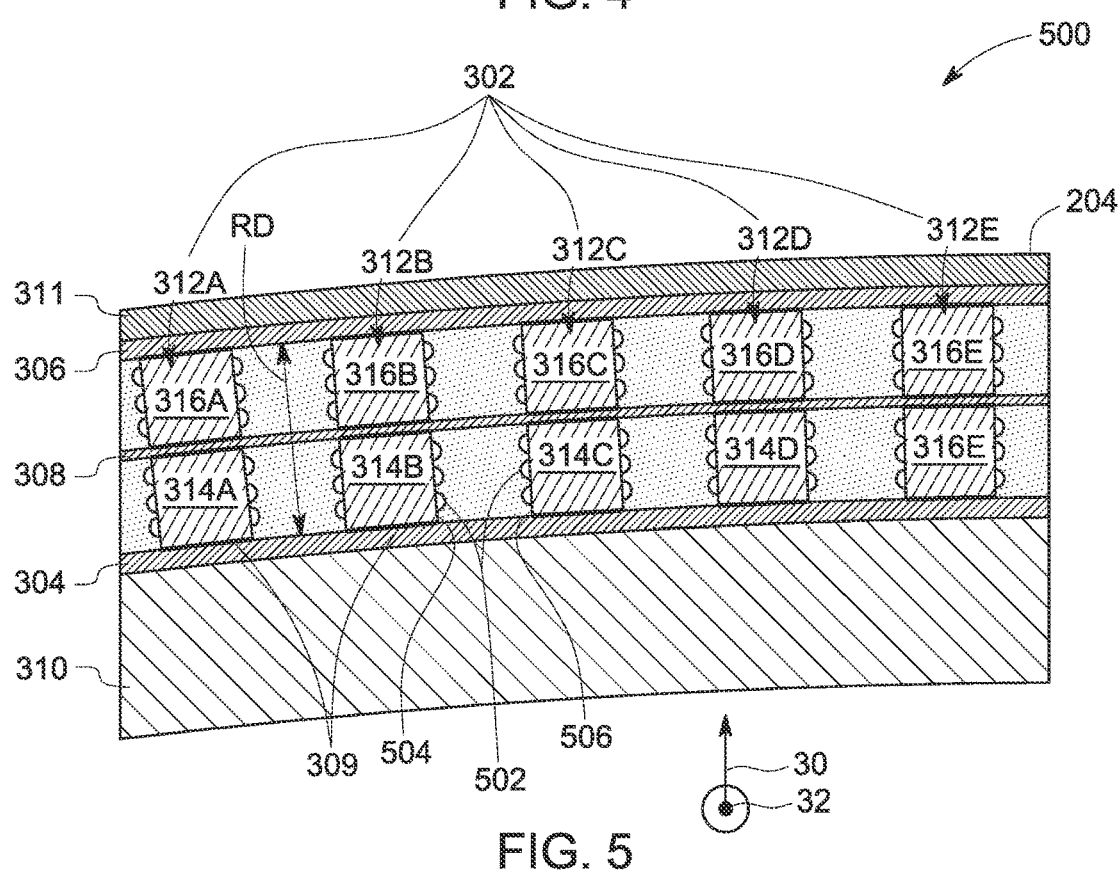
FIG. 5 is a cross-sectional view of a portion of an armature used in the superconducting generator of FIG. 2, in accordance with another embodiment of the present specification.

Moreover, in some embodiments, the armature 204 may also include a plurality of electrically insulating spacers as depicted in FIGS. 4 and 5. Referring now to FIG. 4, a cross-sectional view 400 of the portion 3 (see FIG. 2) of the armature 204 used in the superconducting generator 200 of FIG. 2 is presented, in accordance with another embodiment of the present specification. As depicted in FIG. 4, the armature 204 may include a plurality of electrically insulating spacers 402A, 404A, 402B, 404B, 402C, 404C, 402D, and 404D. For simplicity of illustration, eight electrically insulating spacers are marked with reference numerals 402A, 404A, 402B, 404B, 402C, 404C, 402D, and 404D. The electrically insulating spacers 402A, 402B, 402C, 402D are hereinafter collectively referred to as electrically insulating spacers 402. Similarly, the electrically insulating spacers 404A, 404B, 404C, 404D are hereinafter collectively referred to as electrically insulating spacers 404.

In some embodiments, at least one electrically insulating spacer is disposed between adjacent first side portions 314, and between adjacent second side portions 316. For example, as depicted in FIG. 4, the electrically insulating spacer 402A is disposed between the first side portions 314A and 314B, the electrically insulating spacer 402B is disposed between the first side portions 314B and 314C, the electrically insulating spacer 402C is disposed between the first side portions 314C and 314D, and the electrically insulating spacer 402D is disposed between the first side portions 314D and 314E. Further, the electrically insulating spacer 404A is disposed between the second side portions 316A and 316B, the electrically insulating spacer 404B is disposed between the second side portions 316B and 316C, the electrically insulating spacer 404C is disposed between the second side portions 316C and 316D, and the electrically insulating spacer 404D is disposed between the second side portions 316D and 316E.

In certain embodiments, the electrically insulating spacers 402, 404 may include one or more protrusions (not shown) for aiding in improved grip of the electrically insulating spacers 402, 404 with one or more of the first electrically insulating winding enclosure 304, the second electrically insulating winding enclosure 306, and the electrically insulating coil side separator 308. By way of example, the electrically insulating spacers 402 may include the protrusions on one or more of a top and bottom surfaces of the electrically insulating spacers 402 that face the electrically insulating coil side separator 308 and the first electrically insulating winding enclosure 304, respectively. Also, by way of example, the electrically insulating spacers 404 may include the protrusions on one or more of a top and bottom surfaces of the electrically insulating spacers 404 that face the second electrically insulating winding enclosure 306 and the electrically insulating coil side separator 308, respectively.

Moreover, in some embodiments, one or more of the electrically insulating spacers 402, 404 may include at least one cooling channel configured to facilitate a flow of a cooling fluid therethrough to aid cooling of the armature winding 302. For example, in the embodiment of FIG. 4, each of the electrically insulating spacers 402, 404 are shown to include one cooling channel 406 there within. The cooling channels 406 may extend along a length of the respective electrically insulating spacers 402, 404. In certain other embodiments, the at least one cooling channel may be formed on side walls of one or more of the electrically insulating spacers 402, 404 (see FIG. 5).

Referring now to FIG. 5, a cross-sectional view 500 of the portion 3 of the armature 204 used in the superconducting generator 200 of FIG. 2 is provided, in accordance with yet another embodiment of the present specification. For example, in the embodiment of FIG. 5, each of the electrically insulating spacers 402, 404 are shown to include a plurality of cooling channels 502 on side walls 504, 506 thereof. The cooling channels 502 may extend along a length of the respective electrically insulating spacers 402, 404. During operation of the superconducting generator 200, the cooling fluid may be passed through such cooling channels 406, 502 to facilitate cooling of the armature 204. It will be appreciated that the internal flow cooling channels 406 may support any type of gaseous or condensed cooling fluids such as air or a glycol-water mixture. In certain embodiments, the cooling channels 502 may be used facilitate a flow of gaseous cooling fluids due to the proximity of the cooling channels 502 with the coils 312.

Further in the embodiments of FIGS. 3-5 one set of the armature winding 302, the electrically insulating coil side separator 308, and the second electrically insulating winding enclosure 306 are shown disposed between the first electrically insulating winding enclosure 304 and the shield 311. However, in some other embodiments, two or more than two such sets of the armature winding 302, the electrically insulating coil side separator 308, and the second electrically insulating winding enclosure 306 may be disposed between the first electrically insulating winding enclosure 304 and the shield 311 to create a winding with more than two layers, without limiting the scope of the present specification.

Figure 6:
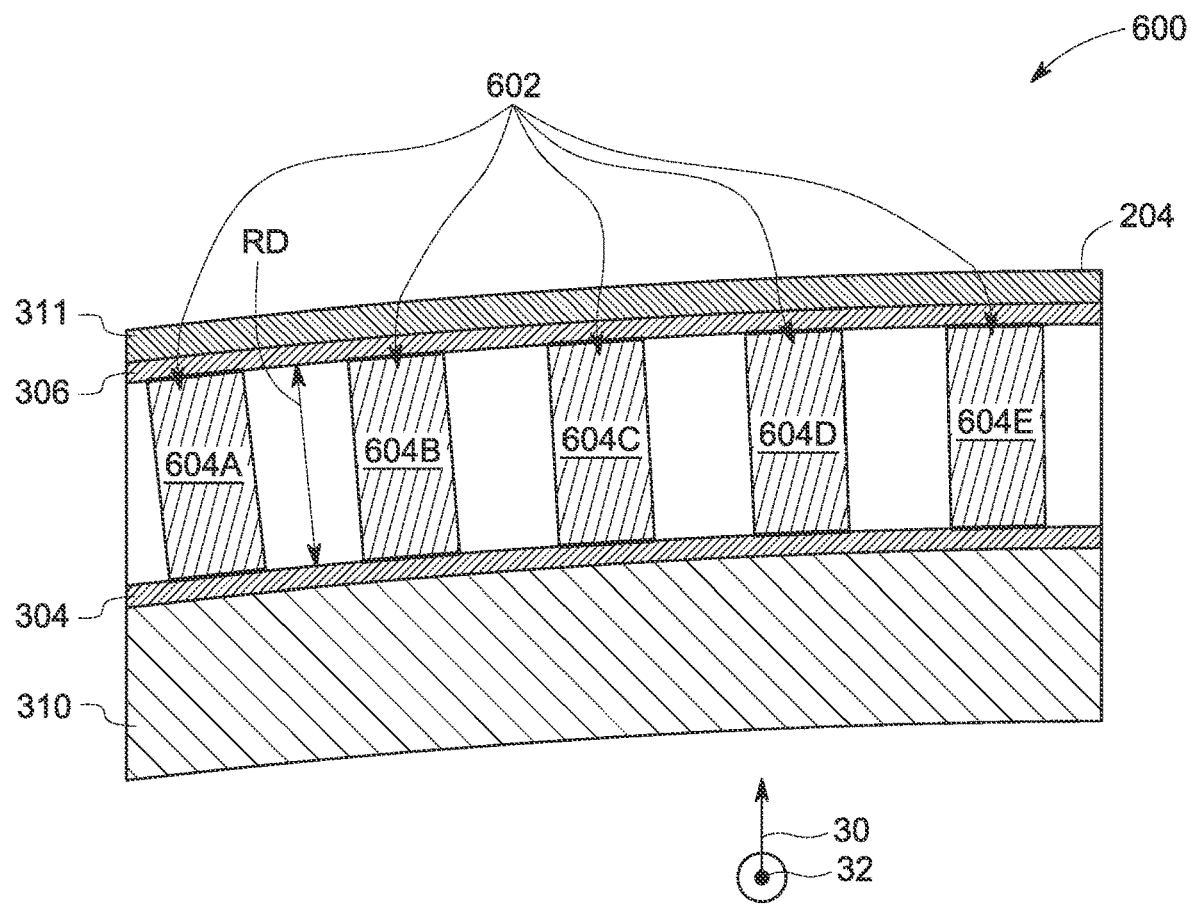
FIG. 6 is a cross-sectional view of a portion of an armature used in the superconducting generator of FIG. 2, in accordance with yet another embodiment of the present specification.

In the embodiments of FIGS. 3-5 and 11A-11G, the armature winding 302 is shown as arranged in a double-layer lap distributed configuration. However, without limiting the scope of the present specification, the armature winding 302 may be arranged in various other configurations including, but not limited to, multi-layer winding, integral slot winding, integral slot chorded winding, fractional pitched coil winding, full pitched coil winding, single layer winding (see FIG. 6) such as half-coil concentric winding or whole-coil concentric winding, mush winding, fractional slot winding, fractional slot concentrated winding, distributed winding, helical winding, or combinations thereof. Moreover, the armature winding 302 may be a single-phase winding or a multi-phase winding, for example, a three-phase winding. Referring now to FIG. 6, a cross-sectional view 600 of the portion 3 of the armature 204 used in the superconducting generator of FIG. 2, in accordance with yet another embodiment of the present specification. The armature 204, in accordance with the embodiment of FIG. 6, may include armature winding 602 having coils 604A, 604B, 604C, 604D, and 604E. These coils 604A, 604B, 604C, 604D, and 604E are single layer coils, as shown in FIG. 6. The coils 604A, 604B, 604C, 604D, and 604E are disposed between the first electrically insulating winding enclosure 304 and the second electrically insulating winding enclosure 306. The armature winding 602 may be a single-phase winding or a multi-phase winding, for example, a three-phase winding.

Although not shown in FIG. 6, use of the electrically insulating spacers such as the electrically insulating spacers 402 between adjacent coils of the coils 604A, 604B, 604C, 604D, and 604E is also contemplated, in some embodiments. Moreover, the electrically insulating spacers disposed between the adjacent coils of the coils 604A, 604B, 604C, 604D, and 604E may also include at least one cooling channel such as the cooling channels 406 or 502 to facilitate a flow of the cooling fluid therethrough to aid cooling of the armature winding 602.

Figure 7:
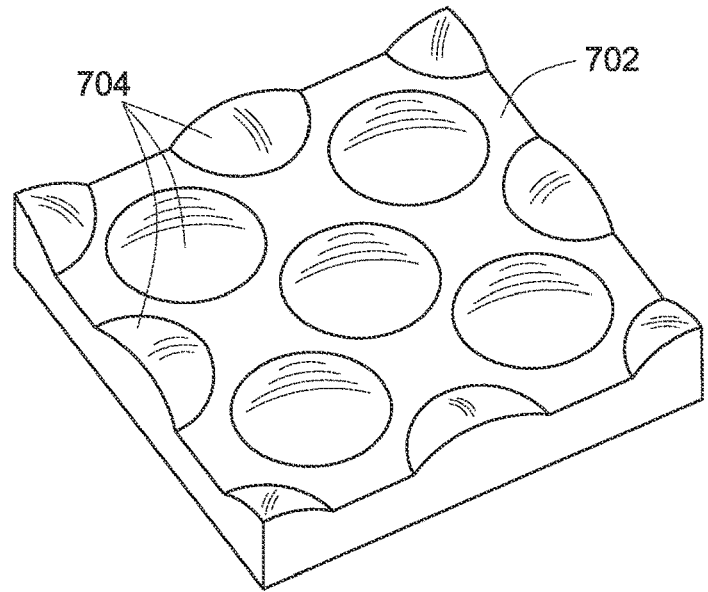
FIG. 7 is a schematic diagram depicting a portion of an internal surface of a cooling channel having surface features, in accordance with one embodiment of the present specification.

To facilitate enhanced cooling of the armature 204, in some embodiments, the cooling channels 406, 502 may include certain surface features. By way of example, FIG. 7 shows a schematic diagram 700 depicting a portion of an internal surface 702 of the cooling channels 406, 502 including such surface features 704, in accordance with one embodiment of the present specification. By way of example, the surface features 704 as shown in FIG. 7 are formed in a shape of dimples. It is to be noted that surface features such as one or more fins, one or more bumps, one or more ridges may also be formed in the internal surface of the cooling channel 406, 502, without limiting scope of the present specification. Advantageously, these surface features 704 increase surface area of the cooling channels 406, 502 for contact with the cooling fluid that flows through the cooling channels 406, 502, thereby enhancing cooling of the armature 204.

Figure 8:
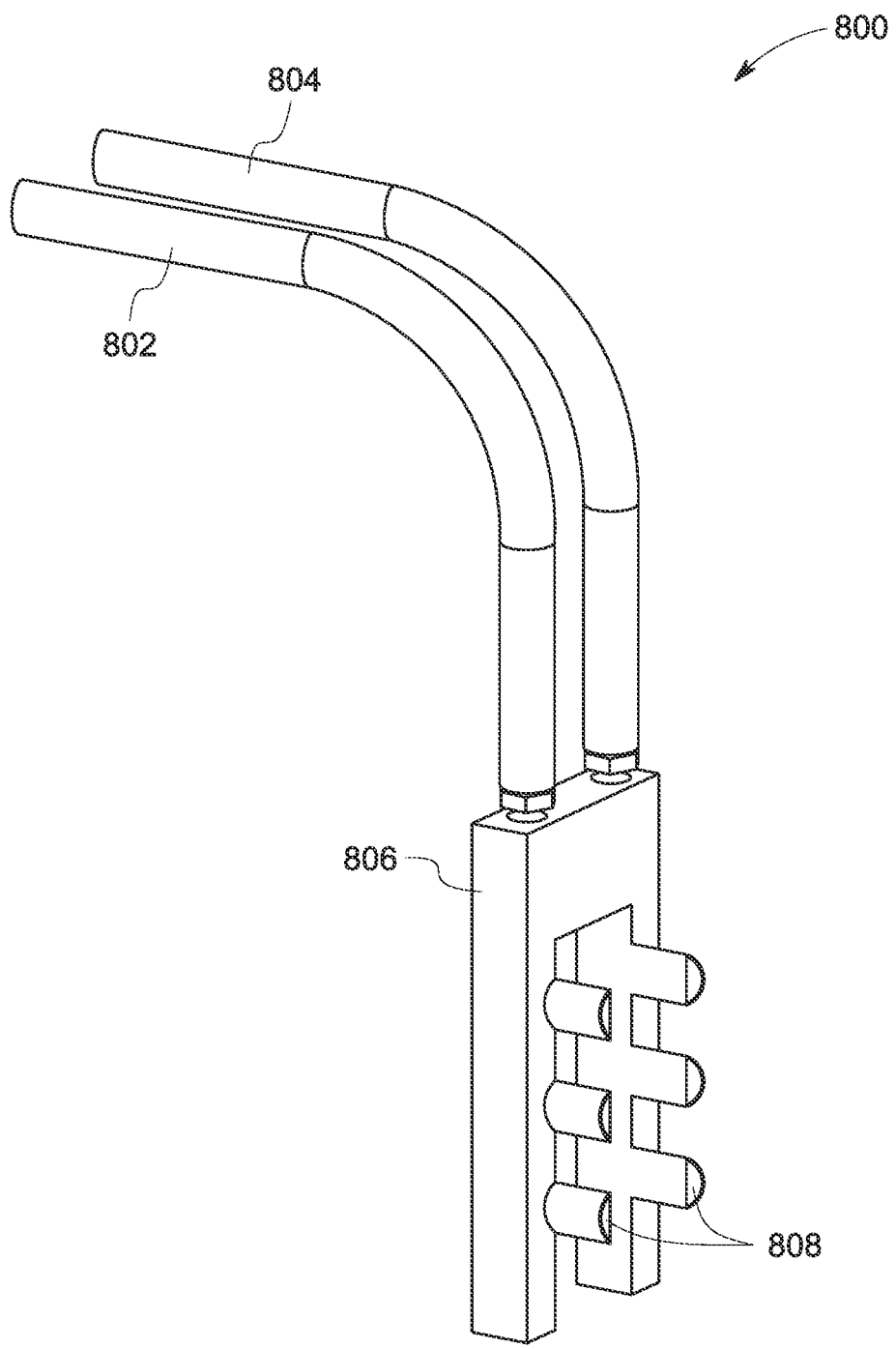
FIG. 8 is a schematic diagram of a cooling manifold that may be connected to an armature having configuration depicted in FIG. 5, in accordance with one embodiment of the present specification.

Referring now to FIG. 8, a schematic diagram of a cooling manifold 800 that may be connected to the armature of FIG. 5 is presented, in accordance with one embodiment of the present specification. The cooling manifold 800 may be attached to the armature 204 to supply the cooling fluid to the cooling channels 502. The cooling fluid when passed though the cooling channels 502, absorbs heat from the armature winding 302. In some embodiments, cooling manifold 800 the may also provide a return path for such heated cooling fluid.

As depicted in FIG. 8, the cooling manifold 800 may include one or more conduits such as conduits 802, 804, and a distributor 806 including one or more outlets 808. The distributor 806 may be configured to divide the cooling fluid received from the conduits 802, 804 into one or more steams of the cooling fluid, where one stream is supplied to each of the one or more outlets 808. In some embodiments, the cooling manifold 800 may be designed to have equal number of outlets 808 as a number of cooling channels 502 of one of the electrically insulating spacers 402, 404.

In some embodiments, the conduits 802 and 804 may be used to supply the cooling fluid through distributor 806 and outlets 808 on one end of the armature 204. On other end of armature 204, other cooling manifold similar to the cooling manifold 800 may be coupled to, where the conduits 802 and 804 may facilitate collection of the cooling fluid via the cooling channels 406 or 502. Alternatively, in certain embodiments, there may not be a need to collect the cooling fluid, in which case the cooling manifold 800 need only supply cooling fluid to the cooling channels 406 or 502.

In some embodiments, a plurality of such cooling manifolds 800 may be connected to the armature 204. For example, one cooling manifold 800 may be connected to each of the electrically insulating spacers 402, 404 of FIG. 5. In some other embodiments, the cooling channels 502 in the armature 204 may be fluidly connected to each other. In such configuration of the armature 204, the cooling manifold 800 may be fluidly coupled to the cooling channels 502 of one of the electrically insulating spacers 402, 404.

Figure 9:
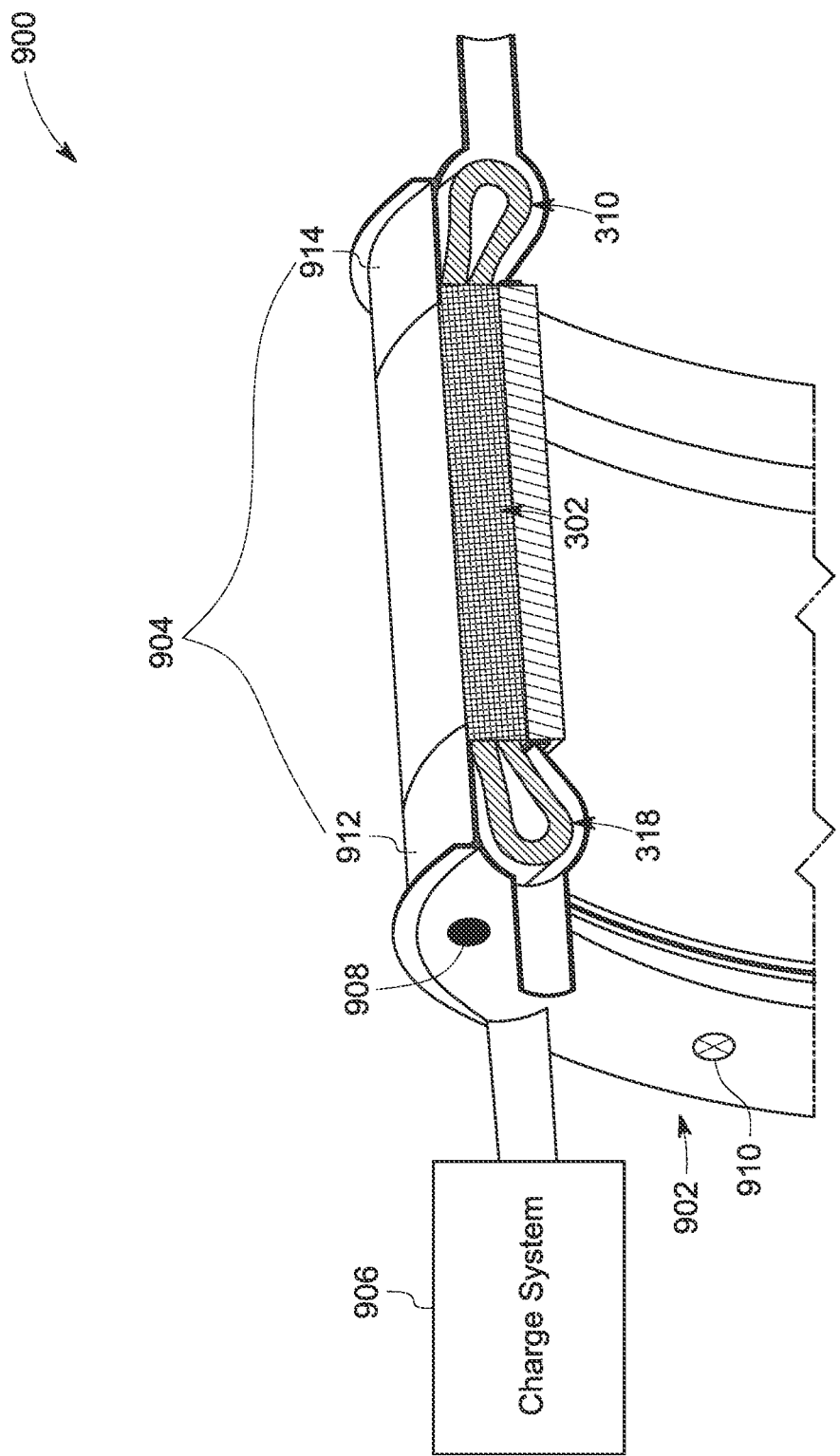
FIG. 9 is a perspective view of a portion of an armature, in accordance with one embodiment of the present specification.

FIG. 9 is a perspective view 900 of a portion of an armature 902, in accordance with one embodiment of the present specification. As depicted in FIG. 9, the armature 902 may have similar configuration as depicted in any of FIGS. 3-5. Additionally, the armature 902 may include a vessel 904, a charge system 906, a pressure sensor 908, and a pressure relief valve 910.

The vessel 904 may be arranged such that the armature winding 302 is enclosed at least partially by the vessel 904. The vessel 904 may provide a pressure tight sealing around, at least, the end portions 318, 320 of the coils 312 of the armature winding 302. In some embodiments, the vessel 904 may include a first half vessel 912 and a second half vessel 914. The first half vessel 912 may be disposed such that the end portions 318 of the coils 312 are enclosed by the first half vessel 912. Further, the second half vessel 914 may be disposed such that the end portions 320 of the coils 312 are enclosed by the second half vessel 914.

The charge system 906 may be fluidly coupled to the vessel 904 and configured to supply a pressurized fluid to the armature winding 302. Non-limiting examples of the pressurized fluid may include air, helium (He), neon (Ne), argon (Ar), hydrogen ($H_2$), nitrogen (N2), sulfur hexafluoride (SF6), or combinations thereof. By way of example, the charge system 906 may include a pump (not shown) or a compressor (not shown) to generate the pressurized fluid to be supplied to the vessel 904. As will be appreciated, due to the presence of the pressurized fluid about the armature winding 302, the voltage capability of the armature winding 302 may be increased. As a result, the armature winding 302 may be operated at increased voltages in comparison to an armature without such arrangement of the vessel 904 and the charge system 906.

Moreover, in certain embodiments, the pressure sensor 908 may be fluidly coupled to the vessel 904 to sense a pressure of the pressurized fluid inside the vessel 904. The information about the sensed pressure may be used by a controller (not shown) associated with the superconducting generator 200 to increase voltage level of the armature winding 302 corresponding to the sensed pressure. Furthermore, a supply of the pressurized fluid to the vessel 904 may also advantageously cool the armature 902 and/or enhance efficiency of a superconducting generator using such armature 902. In certain embodiments, the pressure relief valve 910 may be operated to limit a pressure of the pressurized fluid inside the vessel 904 to a threshold fluid pressure value 904. By way of example, the pressure relief valve 910 may be activated to release the pressure of the pressurized fluid inside the vessel 904 when the pressure of the pressurized fluid reaches above the threshold fluid pressure value. By way of example, the threshold fluid pressure value may be less than or equal to a safe operating pressure that may be withstand by the vessel 904.

Figure 10:
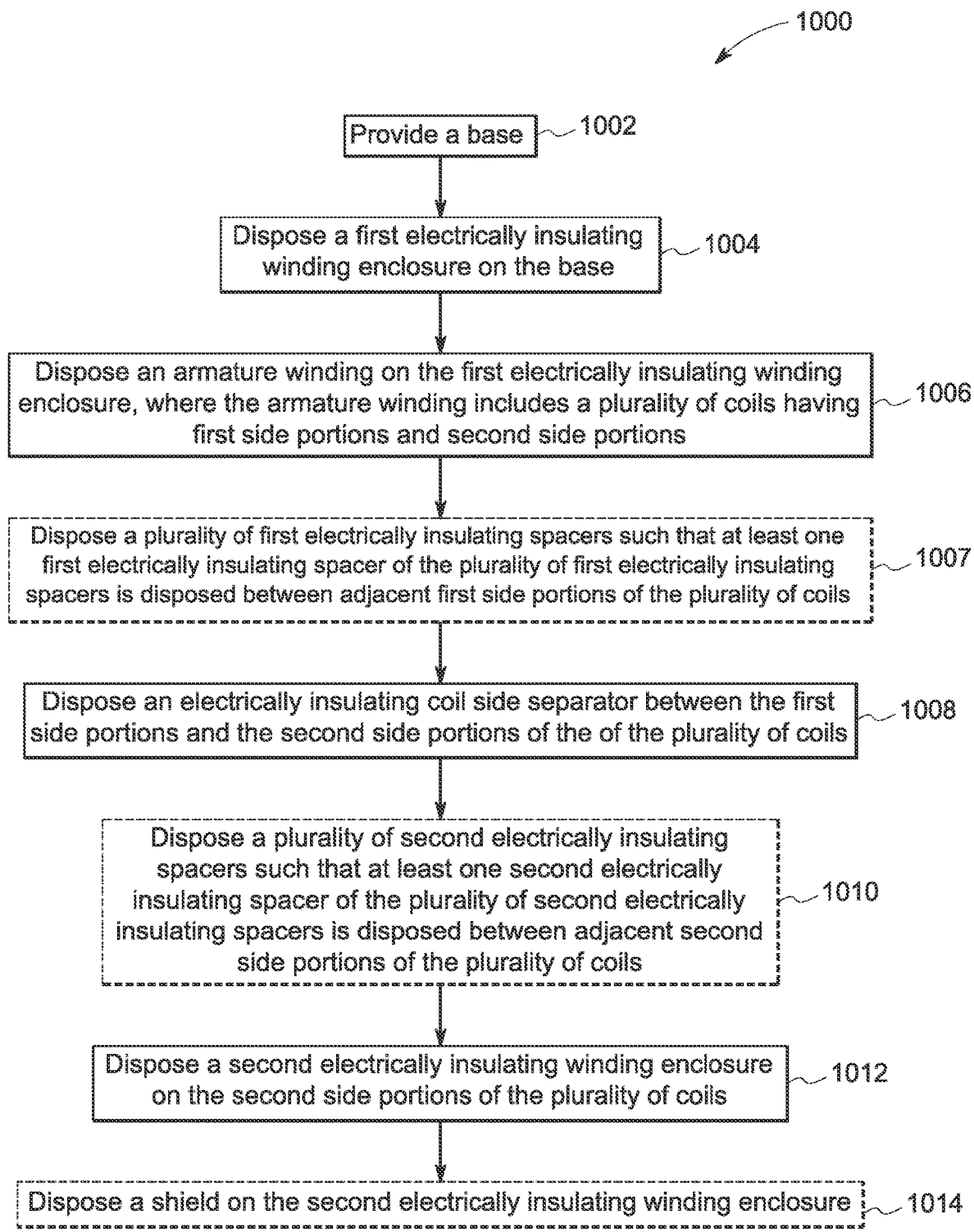
FIG. 10 is a flow diagram of a method for assembling the armature depicted in any of FIGS. 3-5, in accordance with one embodiment of the present specification.

FIG. 10 is a flow diagram 1000 of a method for assembling an armature depicted in any of FIGS. 3-5, in accordance with one embodiment of the present specification. FIGS. 11A-11G depict structures of an armature at corresponding steps of the flowchart 1000 of FIG. 10. Therefore, the flow diagram 1000 of FIG. 10 is described in conjunction with the structures depicted in FIGS. 11A-11G. It is to be noted that the method of FIG. 10 and the structures depicted in FIGS. 11A-11G are described with reference to a portion of the armature 204 for simplicity of illustration. Further, the method of FIG. 10, may be performed to form the armature 204 having a configuration depicted in any of FIG. 4 or FIG. 5, depending on a configuration of the cooling channels in the electrically insulating spacers 402, 404. For simplicity of illustration, same reference numerals as used in FIG. 4 have been used in FIGS. 11A-11G.

Figure 11A:
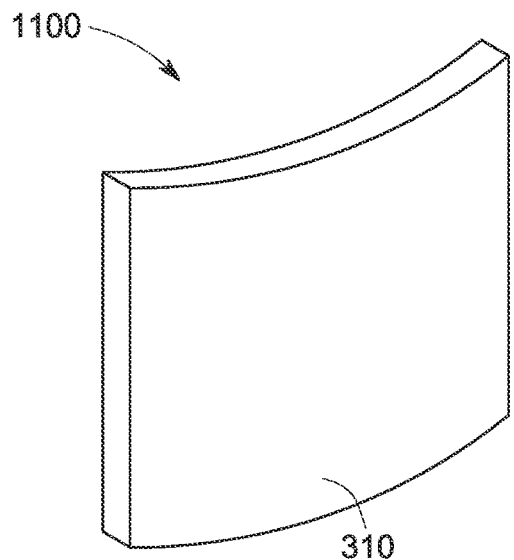
FIGS. 11A-11G depict structures of an armature at various steps of the method of FIG. 10.
Figure 11B:
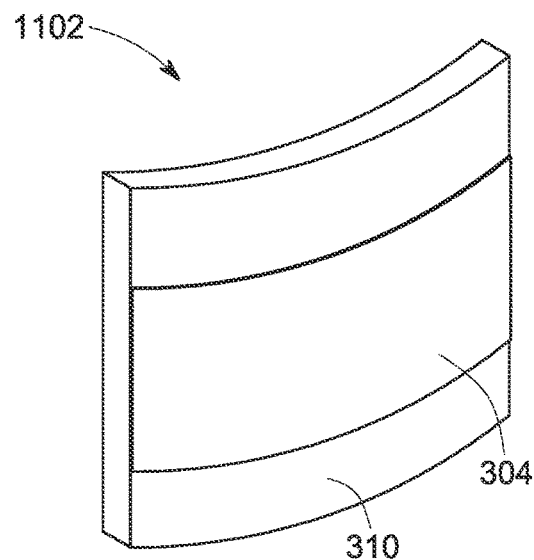

At step 1002, a base 310 is provided. By way of example, the base 310 (see FIG. 11A) may be of a cylindrical shape. In FIG. 11A, a portion 1100 of the base 310 is depicted. Non-limiting example of materials used to form the base 310 may include, a filer reinforced polymer such G-10. In some embodiments, the base 310 may be formed by machining a solid block of material. In some other embodiments, the base 310 may be formed by stacking a plurality of laminates, such as those that form shield 311, such as those that form shield 311. Further, the first electrically insulating winding enclosure 304 may be disposed on the base 310, as indicated by step 1004. By way of example, at step 1004, a structure 1102 as depicted in FIG. 11B may be obtained. In some embodiments, the first electrically insulating winding enclosure 304 in the form of a sheet of material may be wound on the base 310, as depicted in FIG. 11B. As will be appreciated, the first electrically insulating winding enclosure 304 need not be limited to a tube of having a constant radius. In some embodiments, a radius of the first electrically insulating winding enclosure 304 may be adjusted along a length of the armature 204 to support the end portions 318, 320 of the coils 312.

Figure 11C:
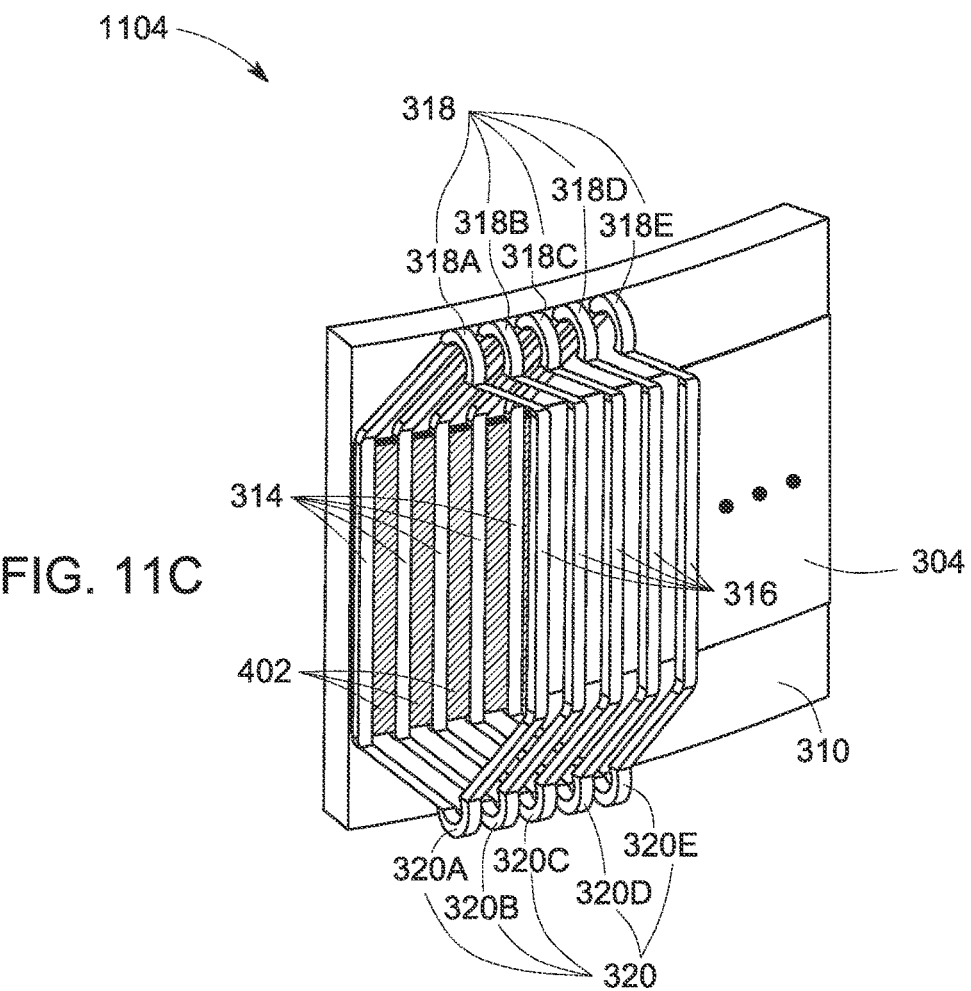
Figure 11D:
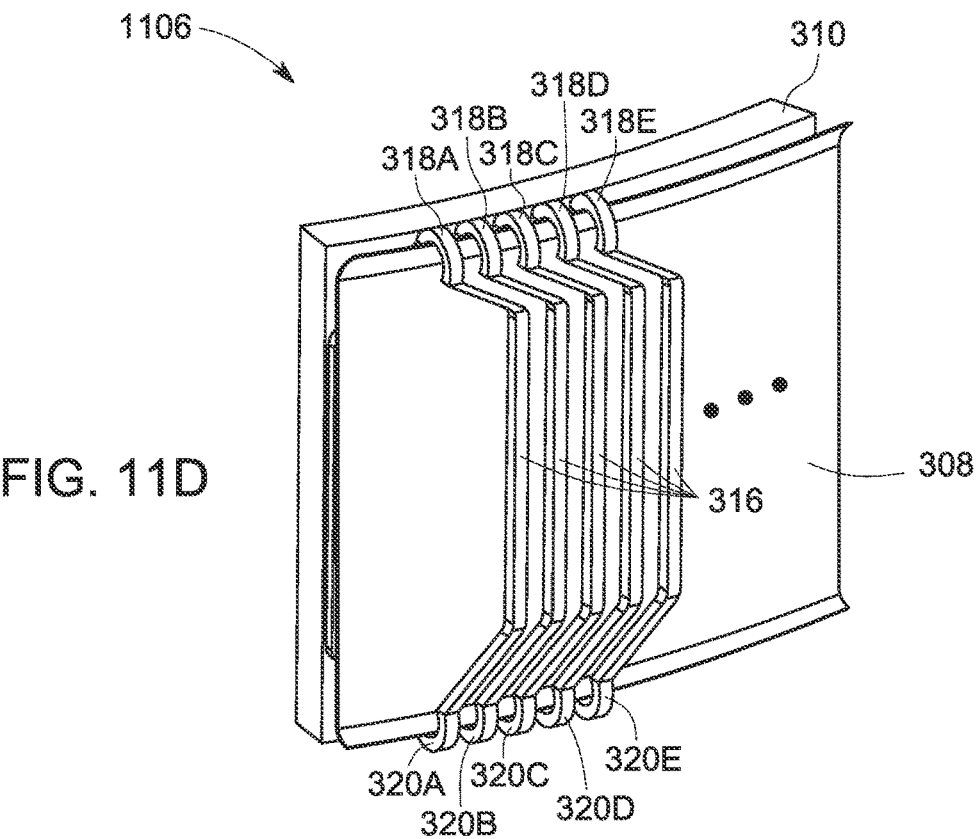

Furthermore, at step 1006, the armature winding 302 is disposed on the first electrically insulating winding enclosure 304, where the armature winding 302 includes the plurality of coils 312 having the first side portions 314 and second side portions 316. More particularly, the coils 312 may be disposed such that the first side portions 314 of the coils 312 may be secured to the first electrically insulating winding enclosure 304. Optionally, in some embodiments, at step 1007, a plurality of first electrically insulating spacers, such as the electrically insulating spacers 402, may be disposed such that at least one first electrically insulating spacer 402 of the plurality of first electrically insulating spacers 402 is disposed between adjacent first side portions 314 of the plurality of coils 312. By way of example, at step 1007, a structure 1104 as depicted in FIG. 11C may be obtained. In some embodiments, the coils 312 and the electrically insulating spacers 402 are disposed alternatively. The electrically insulating spacers 402 may be formed using techniques including, but not limited to, an extrusion, pultrusion, machining, stamping, cutting with water jet, or additive manufacturing. The electrically insulating spacers 402 are used to properly space the first side portions 314 around a periphery of the armature 204. In one embodiment, the electrically insulating spacers 402 may include the cooling channels 406. In another embodiment, the electrically insulating spacers 402 may include the cooling channels 502. In yet another embodiment, the electrically insulating spacers 402 may extend beyond the straight sections (e.g., the side portions 314, 316) of the coils 312 and into the end portions 318, 320 of the coils 312 to facilitate flow of the cooling fluid along a longer section of the coils 312.

Moreover, at step 1008, the electrically insulating coil side separator 308 may be disposed between the first side portions 314 and the second side portions 316 of the coils 312. Accordingly, at step 1008, a structure 1106 depicted in FIG. 11D may be obtained. Since each coil 312 is closed, the electrically insulating coil side separator 308 may be inserted as a sheet that is pulled through each coil 312. The ends of the sheet may be overlapped to provide adequate insulation integrity. The electrically insulating coil side separator 308 is configured to maintain a spacing between the first side portions 314 and the second side portions 316 of the coils 312 so that they do not come in physical contact. Also, in some embodiment, an axial length of the electrically insulating coil side separator 308 may be selected such that the electrically insulating coil side separator 308 reaches up to the end portions 318, 320 of the coils 312. Moreover, the electrically insulating coil side separator 308 may serve as a flow separator for separating air flows inside the armature. Separating the flows results in more effective cooling of the end portions 318, 320 of the coils 312. In some embodiments, the electrically insulating coil side separator 308 may be designed to follow the coils 312 about the end portions 318, 320 as the end portions 318, 320 loop through a circular helix at an axial extent of the respective coil 312, thereby creating a contoured baffle for directing the cooling fluid such as air. In such configuration, the electrically insulating coil side separator 308 may have shape similar to a tear-drop shape when viewed in a r-z cross-section (not shown).

Figure 11E:
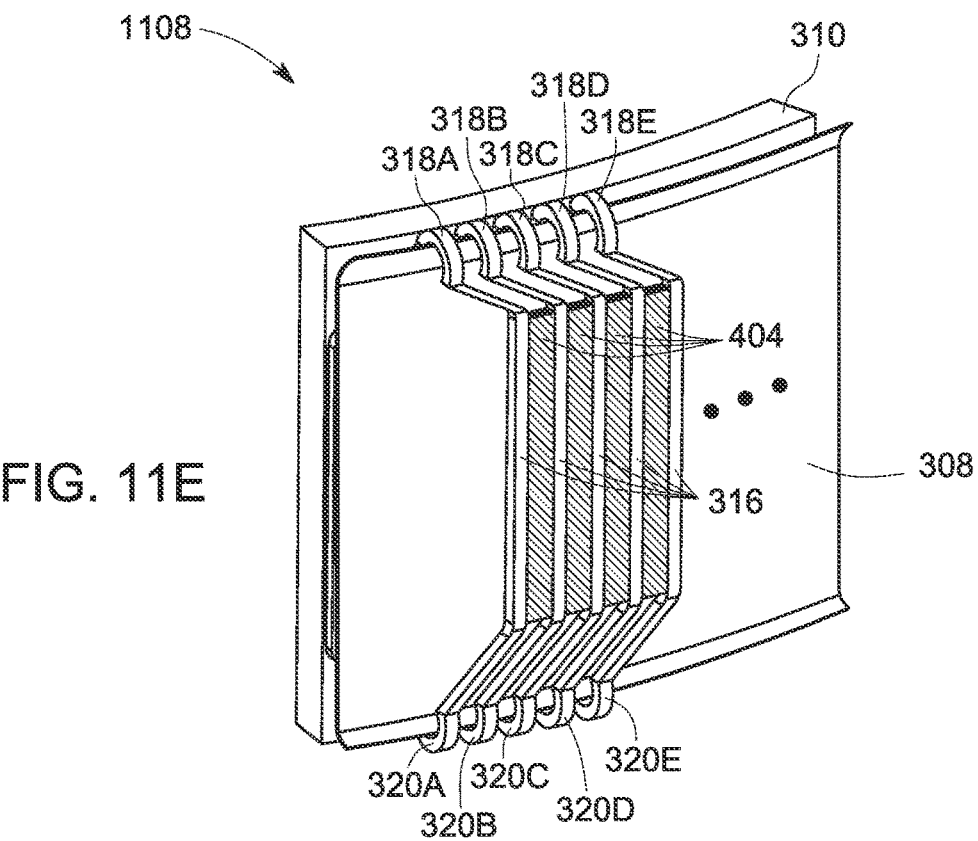

Also, at step 1010, optionally, a plurality of second electrically insulating spacers, such as the electrically insulating spacers 404, is disposed such that at least one second electrically insulating spacer 404 is disposed between adjacent second side portions 316 of the plurality of coils 312. The electrically insulating spacers 404 may be formed using techniques including, but not limited to, an extrusion, pultrusion, machining, stamping, cutting with water jet, or additive manufacturing. The electrically insulating spacers 404 are used to properly space the first side portions 314 around a periphery of the armature (depicted in FIG. 4 or 5) such that a structure 1108 as depicted in FIG. 11E may be obtained at step 1010. In one embodiment, the electrically insulating spacers 404 may include the cooling channels 406. In another embodiment, the electrically insulating spacers 404 may include the cooling channels 502. In yet another embodiment, the electrically insulation spacers 404 may extend into the end portions 318, 320 of the coils 312 to facilitate the flow of the cooling fluid along the coils 312 over a longer length.

Figure 11F:
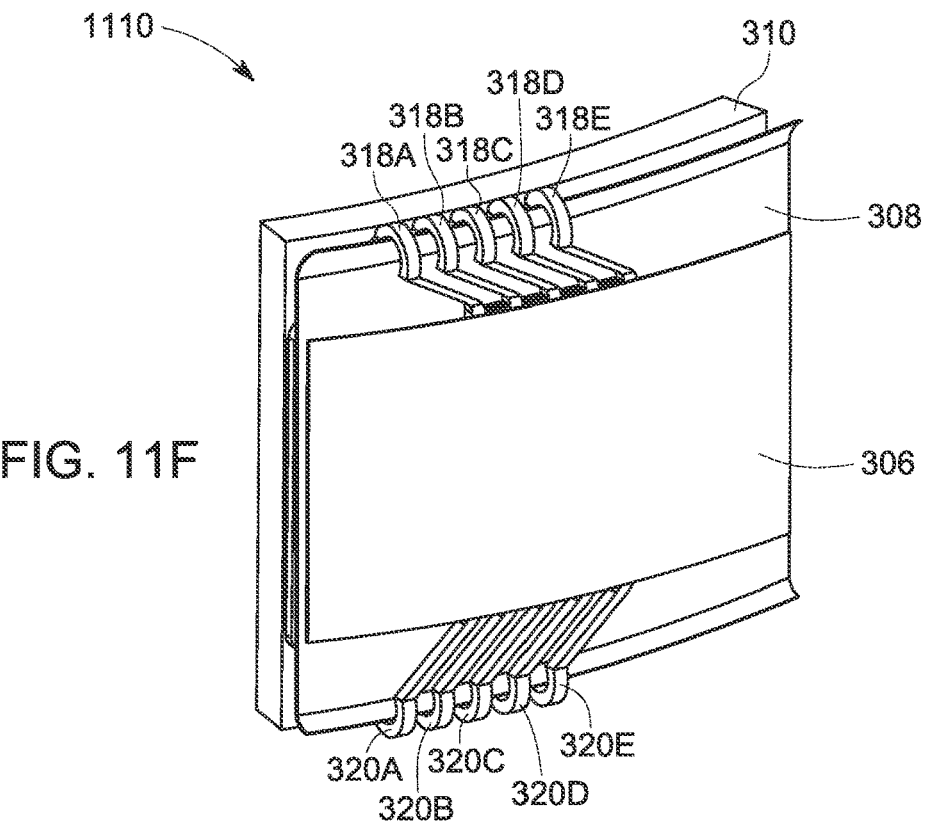

Furthermore, at step 1012, the second electrically insulating winding enclosure 306 may be disposed on the second side portions 316 of the coils 312. In particular, the second electrically insulating winding enclosure 306 may be disposed on the resulting structure 1108 of FIG. 11E. In some embodiments, the second electrically insulating winding enclosure 306 may be wound on the structure 1108 to obtain a structure 1110, as depicted in FIG. 11F. As will be appreciated, the second electrically insulating winding enclosure 306 need not be limited to a tube of having a constant radius. In some embodiments, a radius of the second electrically insulating winding enclosure 306 may be adjusted along a length of the armature 204 to support the end portions 318, 320 of the coils 312.

In some embodiments, when sheets of composite fiber are used as the first electrically insulating winding enclosure 304, the second electrically insulating winding enclosure 306, and the electrically insulating coil side separator 308, the resulting armature structure may be impregnated with an appropriate resin and then cured to form a solid structure of the armature 204. Such composite fiber sheets may be pre-tackified with a determined amount of resin to give improved structural stability of the armature 204 and aid in armature assembly. In certain embodiments, silicone rubber fillers may be used to maintain the cooling channels 406, 502. The silicone rubber fillers may be removed after the curing of the armature 204.

In some other embodiments, sheets that are pre-impregnated with resin may be used as the first electrically insulating winding enclosure 304, the second electrically insulating winding enclosure 306, and the electrically insulating coil side separator 308. When the sheets that are pre-impregnated with resin are used, the resulting armature 204 may be heated to cure the resin, thereby bonding the elements of the armature 204 together. In certain embodiments, once the electrically insulating coil side separator 308 is disposed, one or more slots are cut into the electrically insulating coil side separator 308. The coils 312 are then inserted into the slots. After the coils 312 are inserted, the slots may be sealed.

Figure 11G:
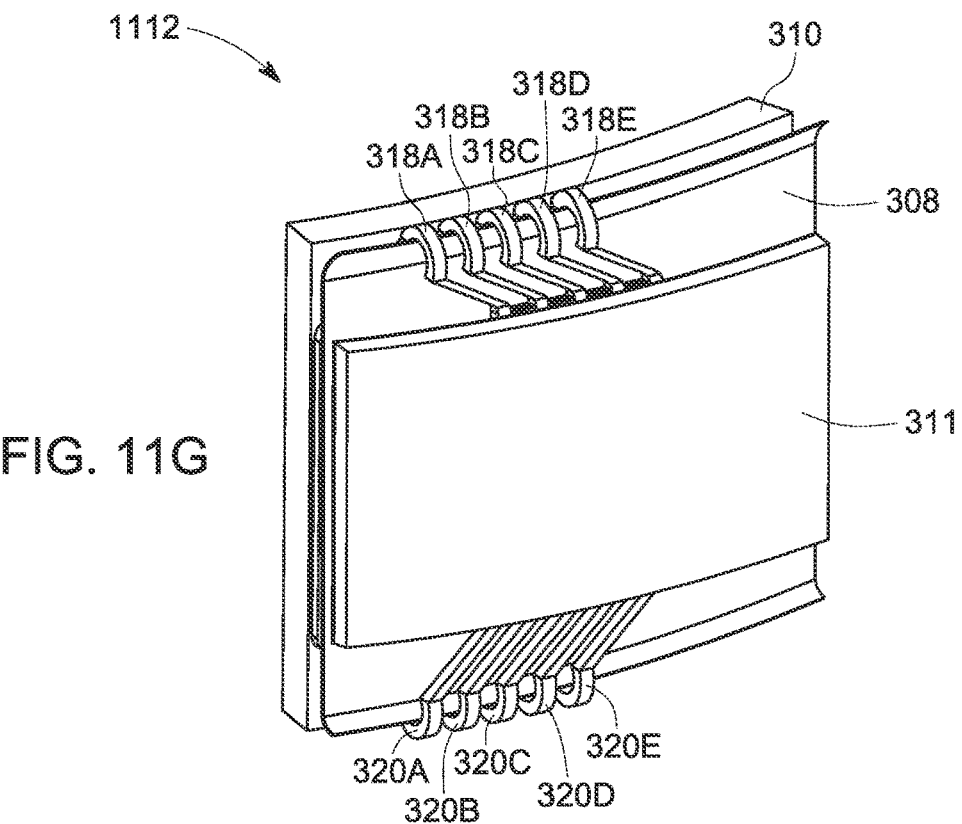

Furthermore, optionally, at step 1014, the shield 311 is disposed on the second electrically insulating winding enclosure 306. By way of example, the passive shield is disposed surrounding the structure 1110 to obtain a structure 1112 as depicted in FIG. 11G. Advantageously, use of the shield 311 improves electromagnetic performance of the superconducting generator 200 that uses the armature 204. The shield 311 may be formed using ferromagnetic material. In some embodiments, the shield 311 may be formed by stacking multiple laminations of around the second electrically insulating winding enclosure 306.

In some embodiments, in the method of FIG. 10, if the steps 1007 and 1010 are omitted, the method of FIG. 10 may lead to formation of an armature similar to the armature 300 of FIG. 3.

In accordance with the embodiments described herein, an improved wind turbine such as the wind turbine 100 and an improved superconducting generator such as the superconducting generator 114, 200 are provided. The improvements in the wind turbine 100 and the superconducting generator 114, 200 may be achieved, at least partially, due to an enhanced configuration of the armature 204, in accordance with some embodiments of the present specification.

As noted earlier, the armature 204 includes various elements, such as, the first and second electrically insulating winding enclosures 304, 306, the electrically insulating coil side separator 308, and the electrically insulating spacers 314, 316 that are formed using non-ferromagnetic and electrically insulating materials. Moreover, the armature 204 does not include ferromagnetic teeth. Advantageously, the absence of ferromagnetic material close to the armature windings 312 eases insulation requirements of the armature windings 312. Further, via use of the electrically insulating spacers 314, 316, space between the adjacent the armature windings 312 is better utilized for structural support, insulation, and cooling, without detracting from the magnetic operation of the armature windings. Moreover, due to use of the non-ferromagnetic and electrically insulating materials, the armature winding 312 may be operated at increased magnetic fields produced by the superconducting field winding 208. Additionally, use of the electrically insulating spacers 314, 316 instead of ferromagnetic teeth reduces the harmonic spectrum of the magnetic fields in the air gap between the stationary generator field 202 and the armature 204.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

The invention claimed is:

1. A superconducting generator, comprising:
a stationary generator field;
a superconducting field winding disposed on the stationary generator field;
a generator rotor;
an armature disposed on the generator rotor concentric to the stationary generator field, the armature providing a rotatable armature field relative to the stationary generator field, wherein the armature comprises:
an armature winding comprising a plurality of coils, wherein each coil of the plurality of coils is spaced apart from adjacent coils and comprises a first side portion and a second side portion;
a first electrically insulating winding enclosure;
a second electrically insulating winding enclosure disposed at a radial distance from the first electrically insulating winding enclosure, wherein the armature winding is disposed between the first electrically insulating winding enclosure and the second electrically insulating winding enclosure; and
an electrically insulating coil side separator disposed between the first side portion and the second side portion of the plurality of coils of the armature winding.

2. The armature of claim 1, wherein the armature further comprises a plurality of electrically insulating spacers, wherein at least one electrically insulating spacer of the plurality of electrically insulating spacers is disposed between adjacent first side portions, and between adjacent second side portions.

3. The armature of claim 2, and wherein one or more of the plurality of electrically insulating spacers comprise at least one cooling channel configured to facilitate a flow of a cooling fluid therethrough to aid cooling of the armature winding.

4. A wind turbine, comprising:
a rotor comprising a plurality of blades;
a shaft coupled to the rotor; and
a superconducting generator coupled to the rotor via the shaft and configured to be operated via the rotor, wherein the superconducting generator comprises:
a stationary generator field;
a superconducting field winding disposed on the stationary generator field; and
an armature disposed on a rotor of the superconducting generator concentric to the stationary generator field, the armature providing a rotatable armature field relative to the stationary generator field, wherein the armature comprises:
an armature winding comprising a plurality of coils, wherein each coil of the plurality of coils is spaced apart from adjacent coils and comprises a first side portion and a second side portion;
a first electrically insulating winding enclosure;
a second electrically insulating winding enclosure disposed at a radial distance from the first electrically insulating winding enclosure, wherein the armature winding is disposed between the first electrically insulating winding enclosure and the second electrically insulating winding enclosure;
an electrically insulating coil side separator disposed between the first side portion and the second side portion of the plurality of coils of the armature winding; and
a plurality of electrically insulating spacers, wherein at least one electrically insulating spacer is disposed between adjacent first side portions, and between adjacent second side portions, and wherein one or more of the plurality of electrically insulating spacers comprise at least one cooling channel configured to facilitate a flow of a cooling fluid therethrough to aid cooling of the armature winding.

5. The wind turbine of claim 4, wherein the first electrically insulating winding enclosure and the second electrically insulating winding enclosure comprise a fiber-reinforced composite.

6. The wind turbine of claim 4, wherein electrically insulating coil side separator comprises a non-ferromagnetic material.

7. The wind turbine of claim 4, wherein the at least one cooling channel is positioned at one or more side walls of the one or more spacers, within a body of the one or more spacers, or both.

8. The wind turbine of claim 4, wherein the plurality of coils is secured with the first electrically insulating winding enclosure, the second electrically insulating winding enclosure, and the electrically insulating coil side separator via a bonding agent.

9. The wind turbine of claim 4, further comprising one or more cooling manifolds fluidly coupled to the at least one cooling channel to supply the cooling fluid thereto.

10. The wind turbine of claim 4, wherein the at least one cooling channel comprises at least one surface feature to facilitate cooling of the armature winding.

11. The wind turbine of claim 10, wherein the at least one surface feature comprises one or more dimples, one or more fins, one or more bumps, one or more ridges, or combinations thereof.

12. The wind turbine of claim 4, wherein the superconducting generator further comprising:

a vessel enclosing, at least partially, the armature winding; and a charge system fluidly coupled to the vessel and configured to supply a pressurized fluid to the armature winding.

13. The wind turbine of claim 12, wherein the superconducting generator further comprising a pressure sensor coupled to the vessel to sense a pressure of the pressurized fluid inside the vessel.

14. The wind turbine of claim 13, wherein the superconducting generator further comprising a pressure release valve to limit a pressure of the pressurized fluid inside the vessel to a threshold fluid pressure value.

* * * * *